United States Patent [19]
Gilligan et al.

[11] 3,716,550
[45] Feb. 13, 1973

[54] PROCESS FOR THE PREPARATION OF VINYLTETRAZOLE

[75] Inventors: William H. Gilligan, Washington, D.C.; Chilton H. McDonnell, Indian Head; Orlando Jones, Pisgah, both of Md.

[73] Assignee: The United States of America as represented by the Secretary of the Navy

[22] Filed: Oct. 29, 1969

[21] Appl. No.: 872,432

[52] U.S. Cl. ................... 260/308 D, 149/19, 260/705
[51] Int. Cl. ............................................. C07d 55/56
[58] Field of Search ................................. 260/308 D

[56] References Cited

UNITED STATES PATENTS

| | | | |
|---|---|---|---|
| 3,055,911 | 9/1962 | Finnegan et al. | 149/109 X |
| 3,351,627 | 11/1967 | Henry | 260/308 D |
| 3,383,389 | 5/1968 | Henry | 260/308 D |

*Primary Examiner*—Leland A. Sebastian
*Attorney*—R. S. Sciascia and J. A. Cooke

[57] ABSTRACT

Improved processes for the preparation of 1-and 2-alkyl-5-vinyltetrazoles which involve the reaction of an ammonium azide and a β-dialkylaminopropionitrile in a water solvent and alkylating the product thereof under a carefully maintained pH.

16 Claims, No Drawings

3,716,550

PROCESS FOR THE PREPARATION OF VINYLTETRAZOLE

BACKGROUND OF THE INVENTION

This invention relates generally to processes for the synthesis of 1-and 2-alkyl-5-vinyltetrazoles and more particularly to improved processes for the synthesis of 1-and 2-methyl-5-vinyltetrazole, which are especially useful as monomer materials from which high-nitrogen content polymeric binder propellant materials can be prepared.

The present state-of-the-art process for the synthesis of 1-and 2-alkyl-5-vinyltetrazoles involves generally the reaction of an dialkylammonium azide with a $\beta$-dialkylaminopropionitrile in a non-aqueous solvent such as dimethylformamide (DMF). This initial reaction forms a 5-($\beta$-dialkylaminoethyl) tetrazole. However, it is essential that the DMF solvent be removed completely since its presence contaminates the final products. Since at this stage of the synthesis the products are in a slurry form and since the DMF is a high boiling liquid, it is extremely difficult to remove all of it even under reduced pressure. In practice, it has been found that it is necessary to dissolve the tetrazole and other salts in water and then extract the water layer with methylene chloride to remove the last portions of the DMF. This total extraction process is obviously tedious and costly. The aqueous solution of the 5-($\beta$-dialkylaminoethyl) tetrazole is then alkylated with a dialkylsulfate in the presence of sodium bicarbonate to form a mixture of 1- and 2-alkyl-5-($\beta$-trialkylammoniumalkyl) tetrazole which upon the application of heat forms a mixture of desired 1-and 2-alkyl-5-vinyltetrazoles. This mixture consists of approximately equal quantities of the two isomers which are separated by fractional distillation. However, in large scale operations, great difficulties are encountered in separating these isomers because of their very high boiling points and their strong tendency to polymerize. Moreover, sometimes it is desirable to form a greater quantity of one of the isomers than the other. For example, in the case of 1-and 2-methyl-5-vinyltetrazole, the 2-isomer is the more preferred monomer for binder applications and it is therefore usually the more desirable end product of the synthesis. The present state-of-the-art synthesis of these materials as hereinbefore described does not afford a procedure whereby the yields of these end products can be controlled.

SUMMARY OF THE INVENTION

It is therefore one object of the present invention to provide a process for the synthesis of 1-and 2-alkyl-5-vinyltetrazoles.

Another object of the present invention is to provide a more simple and economical process for the synthesis of 1-and 2-alkyl-5-vinyltetrazoles.

Still another object of this invention is to provide a process for the synthesis of 1-and 2-alkyl-5-vinyltetrazoles whereby the isomers are more readily separated.

A further object of the present invention is to provide a process for the synthesis of 1-and 2-alkyl-5-vinyltetrazoles which allows for the control of the yields of each of the isomers and thereby affords greater yeilds of the more desirable isomer.

Finally, it is an object of this invention to provide a process for the synthesis of 1-and 2-alkyl-5-vinyltetrazoles which provides for higher yields of each isomer than heretofore attained.

These and other objects are accomplished by providing a process wherein the 1-and 2-alkyl-5-vinyltetrazoles are completely prepared in aqueous solution with control of the pH of the reaction mixture during the alkylation step and with the further control of the quantities of alkylating agent employed.

DESCRIPTION OF THE PREFERRED EMBODIMENTS

In one embodiment of this invention, the improved process involves the reaction of a $\beta$-dialkylaminopropionitrile with an ammonium or alkylammonium or dialkylammonium azide, preferably in stoichiometric amounts, in aqueous solution at reflux temperature to form a 5-($\beta$-dialkylaminoethyl) tetrazole. The quantity of water solvent is not critical, however it is preferred that the reaction solution be concentrated. Although the ammonium, alkyl or dialkyl ammonium azide may be added to the $\beta$-dialkylaminopropionitrile as a preformed material, preferably it is formed in situ by the addition and reaction of a metal inorganic azide such as sodium or potassium and an ammonium, alkyl or dialkylammonium salt such as a chloride, bromide or sulfate, etc. For more economical purposes, it may be desirable to perform this initial reaction of the present invention simply using a $\beta$-dialkylaminopropionitrile hydrochloride and an inorganic azide in aqueous solvent as starting materials. Therefore, among the starting materials which are encompassed within the scope of this invention are for example, $\beta$-dimethylaminopropionitrile, $\beta$-diethylaminopropionitrile, $\beta$-dipropylaminopropionitrile, ammonium azide, dimethylammonium azide, diethylammonium azide, $\beta$-dimethylaminopropionitrile hydrochloride, $\beta$-diethylaminopropionitrile hydrochloride, $\beta$-dipropylaminopropionitrile hydrochloride, sodium azide, potassium azide and the like. The effective use of water as the solvent during this initial reaction step is a surprising result since normally the reaction of azide ion with a nitrile in aqueous solution does not occur unless the nitrile group is activated by electronegative substituents. The employment of water as the solvent material, now obviously eliminates the burden of extracting deleterious solvents such as dimethylformamide at this point and eliminates the hazard of contamination of the final products due to these harmful solvents and thereby aids in the result of higher yields of the end products. In continuing the preparation, additional water (enough to effect solution) is added to the reaction mixture and the 5-($\beta$-dialkylaminoethyl) tetrazole is alkylated, employing about 1.5 to 2 or more equivalents of an alkylating agent, under a predetermined and carefully controlled pH condition. Any of the known alkylating agents may be employed for the purposes of this invention, but preferably the dialkylsulfates, such as dimethylsulfate, diethylsulfate and dipropylsulfate, are used. After refluxing for about 2 hours, still under carefully controlled pH conditions, the mixture of the 1-and 2-alkyl-5-vinyltetrazoles is extracted from the reaction mixture using a suitable solvent such as methylene chloride, ether, chloroform, etc. and are separated by conventional fractional distillation methods. It has been surprisingly discovered that by the selective determination and control of the pH of the reaction mixture during the alkylation step higher yields of one or the other alkyl-5-vinyltetrazole isomer is obtained. For example, if the alkylation reaction step is run at a specific pH in the range of from about 4 to about 11 high yields of the 2-isomer are realized, while a pH of below about 4 will result in greater yields of the 1-isomer. Table I below is an illustration of the effect of various pH conditions of the reaction mixture during the methylation, employing dimethylsulfate, of 5-($\beta$-dimethylaminoethyl) tetrazole in the present synthesis of 1-and 2-methyl-5-vinyltetrazoles.

TABLE I

Methylation of 5-($\beta$-dimethylaminoethyl) tetrazole at various pHs

| pH | % yield 1-methyl-5-vinyl tetrazole | 2-methyl-5-vinyl tetrazole |
|---|---|---|
| 10.5 | 28 | 62 |
| 8.3 | 32 | 64 |
| 8.1 | 33 | 65 |
| 7.2 | 39 | 61 |
| 6.0 | 44 | 52 |
| 4.0 | 27 | 64 |
| 2.0 | 49 | 3 |

The control of the pH of the reaction mixture during alkylation may be performed by any of the conventional methods known within the art. For example when basic conditions are desired, NaOH or any other compatible hydroxide ion material may be employed and the pH is observed with a pH meter. The sole use of $NaHCO_3$ to afford basic conditions is not desirable since it is not a strong enough base to adjust for the acid conditions which result after the addition of the alkylating agent, like dimethylsulfate. However, sodium bicarbonate ($NaHCO_3$) may be used in combination with another compatible basic material, such as sodium carbonate ($NaCO_3$).

Another embodiment of this invention, utilizes the unexpected discovery that if the amount of alkylating agent is also controlled during the alkylation step of the present process, the resulting tetrazole isomers are selectively formed and thereby are separated without the burdens of fractional distillation. This phenomenon is a result of the discovery that the rate of alkylation of the 1-isomer is very much faster than the rate of alkylation of the 2-isomer. Thus, the isomers can be separated by a two-step alkylation procedure. Therefore, when the alkylation procedure is performed with the addition of 1.5 equivalents of the alkylating agent to the 5-($\beta$-dialkylaminoethyl) tetrazole and refluxed for about 2hours, essentially all of the 1-alkyl-5-vinyltetrazole isomer is obtained and may be extracted with e.g. methylene chloride. After the extraction of the 1-isomer, an excess of alkylating agent (i.e. 0.5 equivalents or more) is added to the remaining aqueous solution still under controlled pH conditions and again refluxed for about 2 hours upon which essentially all of the 2-isomer is obtained and again easily extracted by solvent techniques.

The general nature of the invention having been set forth, the following examples are presented as specific illustrations thereof. It will be understood that the invention is not limited to these examples but is susceptible to various modifications that will be recognized by one of ordinary skill in the art.

Preparation of 1 and 2-alkyl-5-vinyltetrazole

EXAMPLE I

To 0.2 mole of dimethylaminopropionitrile was added dropwise 16.43 ml of concentrated hydrochloric acid at ice-bath temperature. After adding 14.3g (0.22 mole) of sodium azide the slurry was refluxed for 6 hrs. with stirring. After cooling, 200 ml of water and 17g of sodium bicarbonate was added and the pH was adjusted to 8.5 with 12N NaOH. The solution was then methylated with 50 ml of dimethylsulfate at 10° ±2 holding the pH at 8.5 ±0.3 by the addition of 12N NaOH as required. The solution was stirred at pH 8.5 for 2 hr. after the addition was completed. The solution was then refluxed for 2 hours, cooled, and extracted with 5×150 ml methylene chloride. After drying with magnesium sulfate and filtering, the solvent was removed in vacuo to have 16.5g (75 percent) of 1 and 2-Methyl-5-vinylte-trazole. The purity was 99 percent+ as indicated by GLC.

EXAMPLE II 30.0g (0.46 mole) of sodium azide was added with stirring to a solution of 41.0g (0.42 mole) of dimethylaminopropionitrile and 37.5g (0.46 mole) of dimethylamine hydrochloride in 21 ml of water. This solution was refluxed (111°–120°) for 23 hrs. while passing a slow stream of nitrogen over the surface of the solution. Before complete cooling 450 ml of water was added with stirring and 40g of sodium bicarbonate dissolved in the clear red solution. The pH was adjusted to 8.4 with 12N NaOH and the solution was then methylated with 90 ml of dimethylsulfate over a period of 1 hr. while the pH was held at 8.4 ±0.1 by the addition of 12N sodium hydroxide and the temperature at 27° ±1 by intermittent cooling. The solution was then stirred for 2 hours while holding the pH at 8.4.

After the addition of 0.5g of trinitrobenzene (as a polymerization inhibitor) the solution was refluxed for 2 hrs., cooled and extracted with 6 × 250 ml of methylene chloride. After drying the combined extracts with anhydrous magnesium sulfate and filtering, the solvent was removed in vacuo to yield 36.9g (80 percent) of 1 and 2-methyl-5-vinyltetrazole. The product analyzed 97%+ by GLC.

Effect of pH During methylation on the Isomer Ratio

EXAMPLE III a. Ph 4.0. The pH of a solution of 4.36g (0.031 mole) of 5-($\beta$-dimethylaminoethyl) tetrazole in 37 ml of water was adjusted to 4.0 with concentrated sulfuric acid. Then, 7.5 ml (0.08 mole) of dimethyl sulfate was added dripwise over a period of 1 hour. During the methylation the pH was held at 4.0 ±0.2 by the addition of 6N sodium hydroxide as required and the temperature at 24° ±1° by intermittent cooling with an ice bath. After the addition of the dimethyl sulfate, the solution was stirred for 30 minutes and then the pH was adjusted to 8.5 with solid sodium hydroxide. After adding 50 mg of trinitrobenzene, the solution was refluxed for 2 hours, cooled and extracted with 5 × 150 ml methylene chloride. After drying the extract with anhydrous magnesium sulfate and filtering the solvent was removed in vacuo.

The weight of the product was 3.1g (91 percent). The product was essentially pure by GLC analysis and showed a ratio of 2-methyl-5-vinyltetrazole to 1-methyl-5-vinyltetrazole of 2.43:1.

b. pH 8.3. Method same as (a) above except that the pH was held at 8.3 ±0.2 by the addition of 6N NaOH as required during the methylation. The yield of product was 3.31g (97 percent). The purity was 99%+ as indicated by GLC analysis and the ratio of 2-methyl-5-vinyltetrazole to 1-methyl-5-vinyltetrazole was 2.1:1.

c. pH 2.0. Method same as (a) above except that the pH during methylation was held at 2.0 ±0.2 by the addition of concentrated sulfuric acid is required. The yield of product was 52 percent with a ratio of 2-isomer to 1 of 1:15.1.

Selective Separation of 1-alkyl and 2-alkyl-5-vinyltetrazole

EXAMPLE IV

The pH of a solution of 4.36g (0.031 mole) of 5-($\beta\beta$-dimethylaminoethyl) tetrazole and 2.87g (0.035 mole) of sodium acetate in 37 ml of water was adjusted to pH 6.0 with 12N sulfuric acid. The solution was methylated with 5 ml (1.5 equiv. of dimethylsulfate over a period of 1 hour. During the methylation the pH was maintained at 6.0 ±0.1 by the addition of 12N sodium hydroxide and the temperature was held at 25° ±1°. After the addition of the sulfate the solution was stirred for 2 hours at pH 6.0. The pH was then readjusted to 8.4, 50 mg of trinitrobenzene was added and the solution refluxed for 2 hours.

The yield of product after isolation in the usual fashion was 1.55g (45 percent corr.). The purity was 97 percent by GLC analysis and consisted of 42 percent of 1-methyl-5-vinyltetrazole and 3.2 percent of 2-methyl-5-vinyltetrazole.

The aqueous solution from the above methylation was methylated with an additional 3ml of dimethylsulfate under the same conditions. An additional 1.72g (51 percent) of product was obtained. GLC analysis showed 49 percent of 2-methyl-5-vinyltetrazole and 2 percent of 1-methyl-5-vinyltetrazole.

We claim:

1. A process for synthesizing a mixture of 1- and 2-alkyl -5-vinyltetrazoles wherein either the 1- or 2-isomer predominates which comprises reacting a $\beta$-lower-dialkylaminopropionitrile wherein said lower-dialkyl is selected from the group consisting of dimethyl, diethyl and dipropyl with an azide compound selected from the group consisting of ammonium azide, a lower-alkylammonium azide and a lower-dialkylammonium azide in an aqueous solvent, alkylating the product thereof in an aqueous solvent under a controlled pH of from either about 4 to about 11 if an excess of the 2-isomer is desired or below about 4 but greater than about 2 if an excess of the 1 isomer is desired, wherein the alkylating step is performed by the addition and reaction of a dialkylsulfate; and refluxing the alkylated products.

2. The process of claim 1 wherein said azide compound is formed in situ by the reaction of a metal inorganic azide compound selected from the group consisting of an alkali metal azide and an alkaline earth metal azide with a compound selected from the group consisting of an ammonium salt, a lower-alkylammonium salt and a lower-dialkylammonium salt.

3. The process of claim 1 wherein said alkylating is performed by the addition and reaction of an alkylating agent selected from the group consisting of dimethylsulfate, diethylsulfate and dipropylsulfate.

4. The process of claim 1 wherein said $\beta$-lower-dialkyl-aminopropionitrile is $\beta$-dimethylaminopropionitrile, said lower-dialkylammonium azide is dimethylammonium azide and said alkylating is performed by the addition and reaction of dimethylsulfate.

5. The process of claim 1 wherein said pH during alkylation is within the range of from about 4–11 thereby allowing a higher yield of the 2-alkyl-5-vinyltetrazole isomer than the 1-alkyl-5-vinyltetrazole isomer.

6. The process of claim 1 wherein said pH during alkylation is less than 4 thereby allowing a higher yield of the 1-alkyl-5-vinyltetrazole isomer than the 2-alkyl-5-vinyltetrazole isomer.

7. A process for synthesizing a mixture of 1- and 2-alkyl-5-vinyltetrazoles wherein either the 1- or 2-isomer predominates which comprises reacting a $\beta$-lower-dialkylaminopropionitrile hydrochloride wherein said lower-dialkyl is selected from the group consisting of dimethyl, diethyl and dipropyl with a metal inorganic azide selected from the group consisting of an alkali metal azide and an alkaline earth metal azide in an aqueous solvent, alkylating the product thereof in an aqueous solvent under a controlled pH of from either about 4 to about 11 if an excess of the 2-isomer is desired or below about 4 but greater than about 2 if an excess of the 1-isomer is desired wherein the alkylating step is performed by the addition and reaction of a dialkylsulfate; and refluxing the alkylated products.

8. The process of claim 7 wherein said pH during alkylation is within the range of from about 4–11 thereby allowing a higher yield of the 2-alkyl-5-vinyltetrazole isomer than the 1-alkyl-5-vinyltetrazole isomer.

9. The process of claim 7 wherein said pH during alkylation is less than 4 thereby allowing a higher yield of the 1-alkyl-5-vinyltetrazole isomer than the 2-alkyl-5-vinyltetrazole isomer.

10. A process for synthesizing and separating 1- and 2-alkyl-5-vinyltetrazole which comprises the steps of:

1. reacting a $\beta$-lower-dialkylaminopropionitrile selected from the group consisting of $\beta$-dimethylaminopropionitrile, $\beta$-diethylaminopropionitrile and $\beta$-dipropylaminopropionitrile with an azide compound selected from the group consisting of ammonium azide, a lower-alkylammonium azide and a lower-dialkylammonium azide in an aqueous solvent, 2. adding to and reacting with the product of step (1) under a controlled pH within the range of from about 2 to about 11 about 1.5 equivalents of an alkylating agent selected from the group consisting of dimethylsulfate, diethylsulfate and dipropylsulfate and refluxing to form the respective 1-alkyl-5-vinyltetrazole isomer, 3. extracting said 1-alkyl-5-vinyltetrazole isomer and adding to and reacting with the remaining aqueous solution, under a controlled pH within the range of from about 2 to about 11, 0.5 or more equivalents of said alkylating agent and refluxing to form the respective 2-alkyl-5-vinyltetrazole isomer and, 4. extracting said 2-alkyl-5-vinyltetrazole isomer.

11. The process of claim 10 wherein said azide compound is formed in situ by the reaction of a metal azide compound selected from the group consisting of an alkali metal azide and an alkaline earth metal azide with a compound selected from the group consisting of an ammonium salt, a lower-alkylammonium salt and a lower-dialkylammonium salt.

12. The process of claim 10 wherein said controlled pH in steps 2 and 3 is within the range of from about 4 to about 11.

13. The process of claim 10 wherein said controlled pH in steps 2 and 3 is less than 4.

14. A process for synthesizing and separating 1- and 2-alkyl-5-vinyltetrazole which comprises the steps of:

1. reacting a β-lower-dialkylaminopropionitrile hydrochloride selected from the group consisting of β-dimethylaminopropionitrile hydrochloride, β-diethylpropionitrile hydrochloride and β-dipropylpropionitrile hydrochloride with a metal inorganic azide selected from the group consisting of an alkali metal azide and an alkaline earth metal azide in an aqueous solvent, 2. adding to and reacting with the product of step (1) under a controlled pH within the range of from about 2 to about 11 about 1.5 equivalents of an alkylating agent selected from the group consisting of dimethylsulfate, diethylsulfate and dipropylsulfate and refluxing to form the respective 1-alkyl-5-vinyltetrazole isomer, 3. extracting said 1-alkyl-5-vinyltetrazole isomer and adding to and reacting with the remaining aqueous solution under a controlled pH within the range of from about 2 to about 11, 0.5 or more equivalents of said alkylating agent and refluxing to form the respective 2-alkyl-5-vinyltetrazole isomer and, 4. extracting said 2-alkyl-5-vinyltetrazole isomer.

15. The process of claim 14 wherein said controlled pH in steps 2 and 3 is within the range of from about 4 to about 11.

16. The process of claim 14 wherein said controlled pH in steps 2 and 3 is less than 4.

* * * * *